(12) United States Patent  (10) Patent No.: US 8,783,711 B2
Webber  (45) Date of Patent: Jul. 22, 2014

(54) LOW MASS PASSENGER AIRBAG DESIGN

(71) Applicant: James Webber, Shelby Township, MI (US)

(72) Inventor: James Webber, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/716,917

(22) Filed: Dec. 17, 2012

(65) Prior Publication Data

US 2014/0167396 A1 Jun. 19, 2014

(51) Int. Cl.
*B60R 21/2155* (2011.01)
*B60R 21/2165* (2011.01)
*B60R 21/205* (2011.01)

(52) U.S. Cl.
CPC ......... *B60R 21/2155* (2013.01); *B60R 21/2165* (2013.01); *B60R 21/205* (2013.01)
USPC ...................... 280/728.3; 280/728.2; 280/732

(58) Field of Classification Search
CPC .... B60R 21/20; B60R 21/201; B60R 21/205; B60R 21/215; B60R 21/2155; B60R 21/2165
USPC .................................. 280/728.2, 728.3, 732
See application file for complete search history.

(56) References Cited

U.S. PATENT DOCUMENTS

| 5,135,253 | A | * | 8/1992 | Hirashima et al. | 280/732 |
|---|---|---|---|---|---|
| 5,303,951 | A | | 4/1994 | Goestenkors et al. | |
| 5,342,090 | A | | 8/1994 | Sobczak et al. | |
| 5,630,617 | A | * | 5/1997 | Hashiba | 280/731 |
| 5,794,967 | A | | 8/1998 | Manire | |
| 6,196,574 | B1 | * | 3/2001 | Stavermann | 280/728.3 |
| 6,325,415 | B1 | | 12/2001 | Zelinski et al. | |
| 6,581,959 | B2 | * | 6/2003 | Muller | 280/728.3 |
| 6,651,998 | B1 | * | 11/2003 | Mayer et al. | 280/728.3 |
| 6,742,804 | B2 | * | 6/2004 | Suzuki et al. | 280/728.3 |
| 6,929,281 | B2 | * | 8/2005 | Loeper et al. | 280/728.3 |
| 7,029,027 | B2 | * | 4/2006 | Gray et al. | 280/728.3 |
| 7,165,780 | B2 | * | 1/2007 | Segura | 280/728.3 |
| 7,806,430 | B2 | | 10/2010 | Cowelchuk et al. | |
| 2002/0024199 | A1 | * | 2/2002 | Helfrich et al. | 280/728.3 |
| 2003/0124295 | A1 | * | 7/2003 | Gundlach et al. | 428/43 |
| 2005/0253369 | A1 | * | 11/2005 | Taoka | 280/752 |
| 2006/0017268 | A1 | * | 1/2006 | Bondoerffer | 280/732 |
| 2006/0202448 | A1 | * | 9/2006 | Sawada et al. | 280/728.3 |
| 2010/0207366 | A1 | * | 8/2010 | Evans et al. | 280/728.3 |

* cited by examiner

*Primary Examiner* — James English
(74) *Attorney, Agent, or Firm* — Ralph E. Smith

(57) ABSTRACT

An airbag module including a housing, an airbag disposed within the housing, and a chute enclosing the airbag within the housing. The chute includes a seam formed therein that is operable to open during deployment of the airbag, wherein the chute includes a projection that extends toward the housing, and the housing includes a grasping feature that engages with the projection during deployment of the airbag to assist in opening the seam.

17 Claims, 12 Drawing Sheets

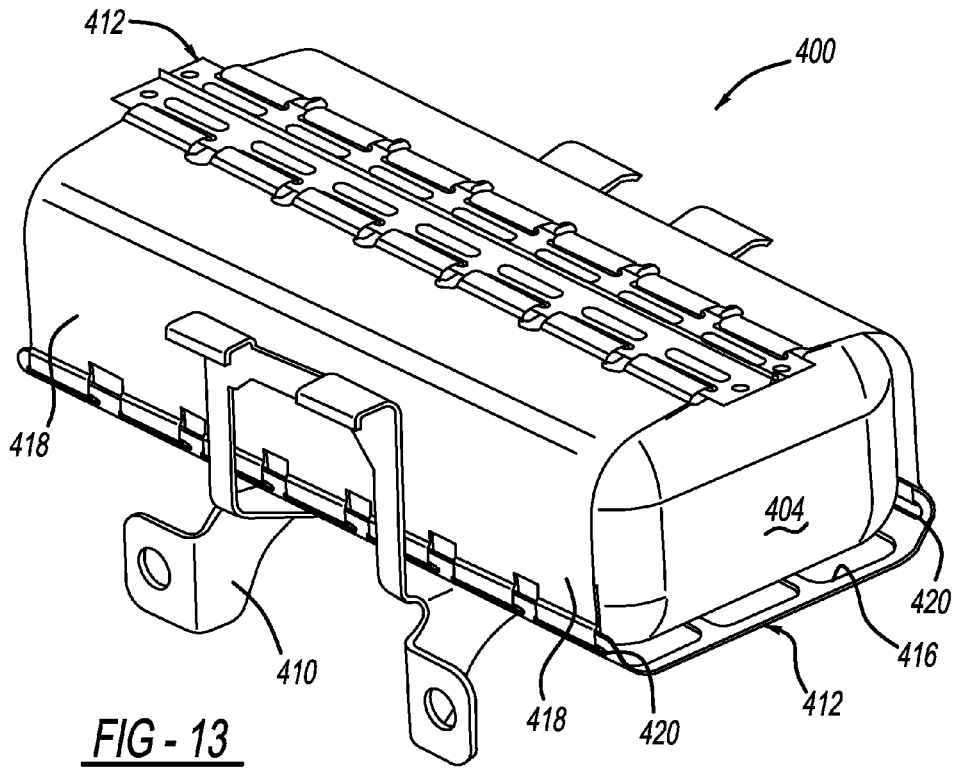
FIG - 13
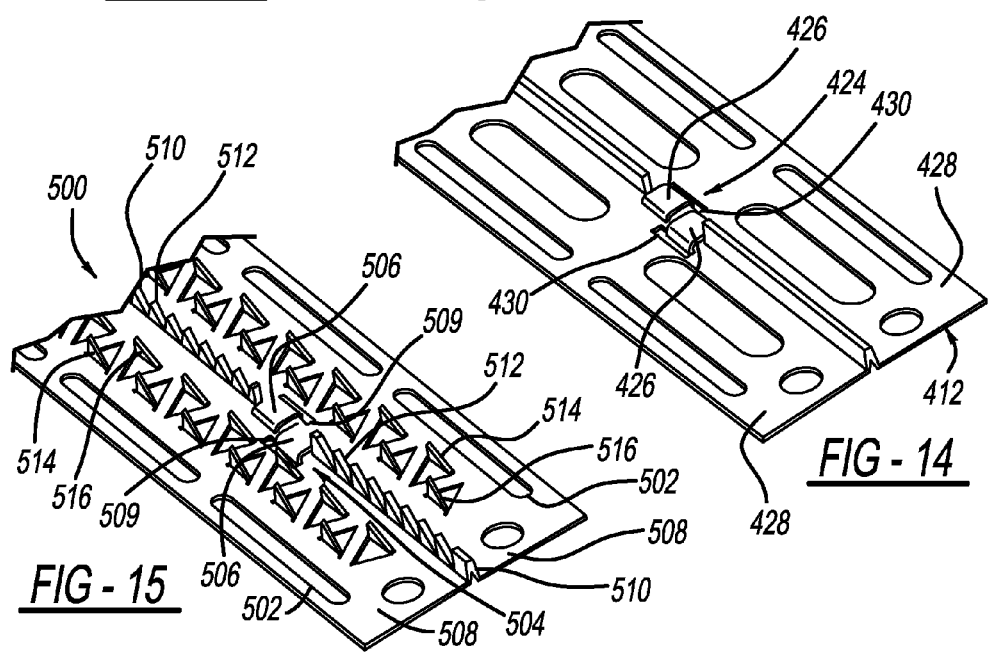
FIG - 15
FIG - 14

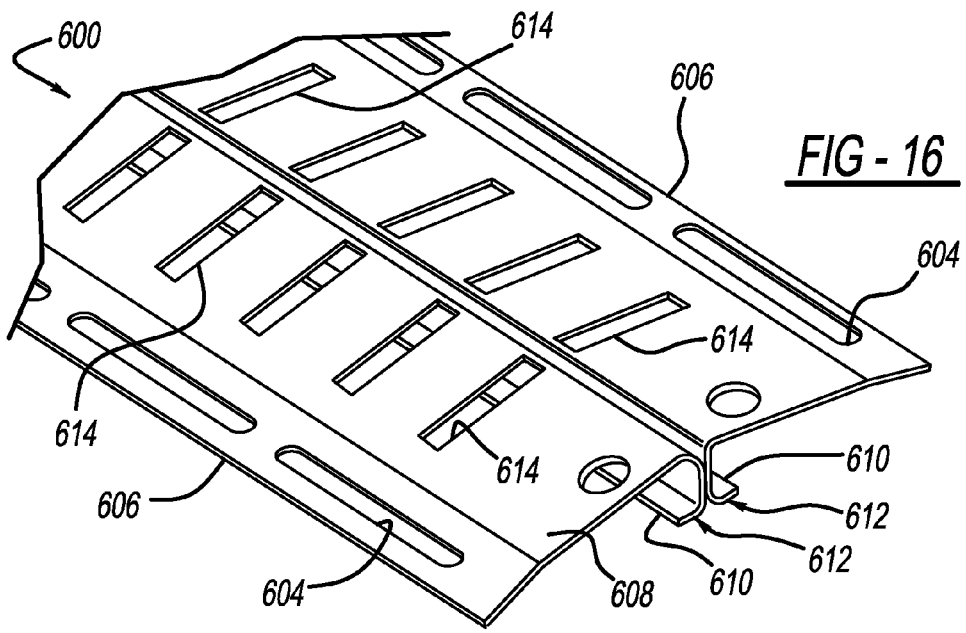
FIG - 16
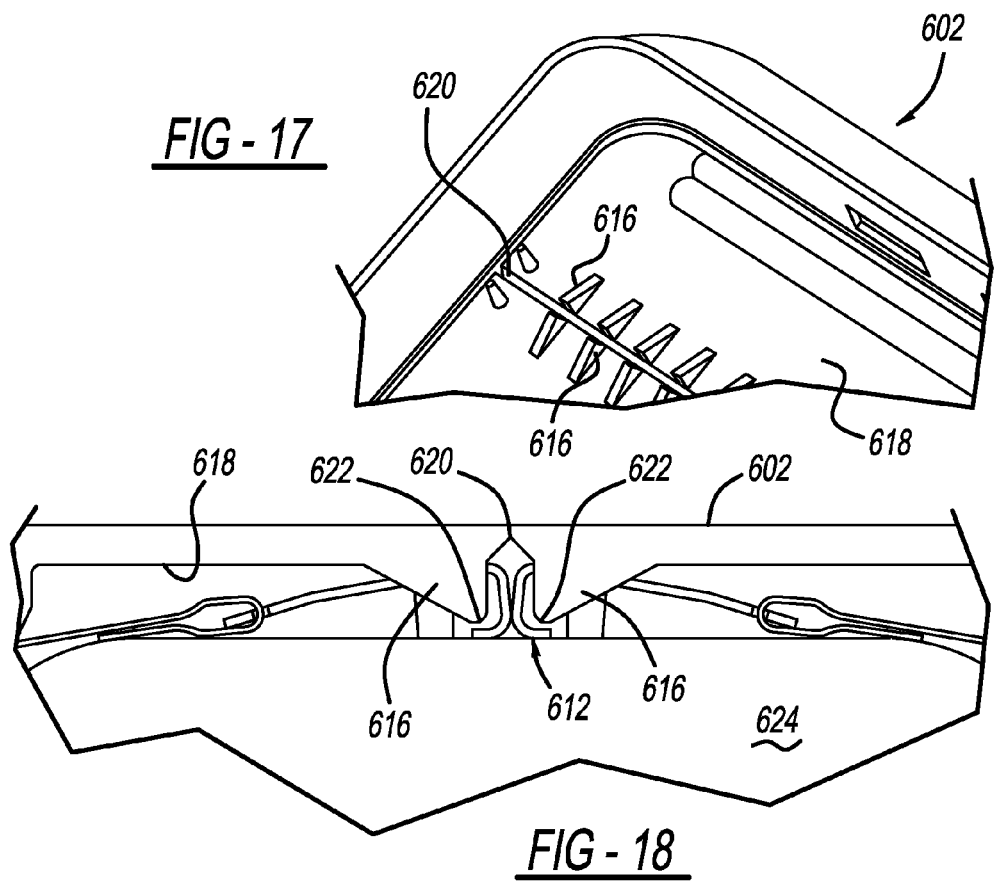
FIG - 17
FIG - 18

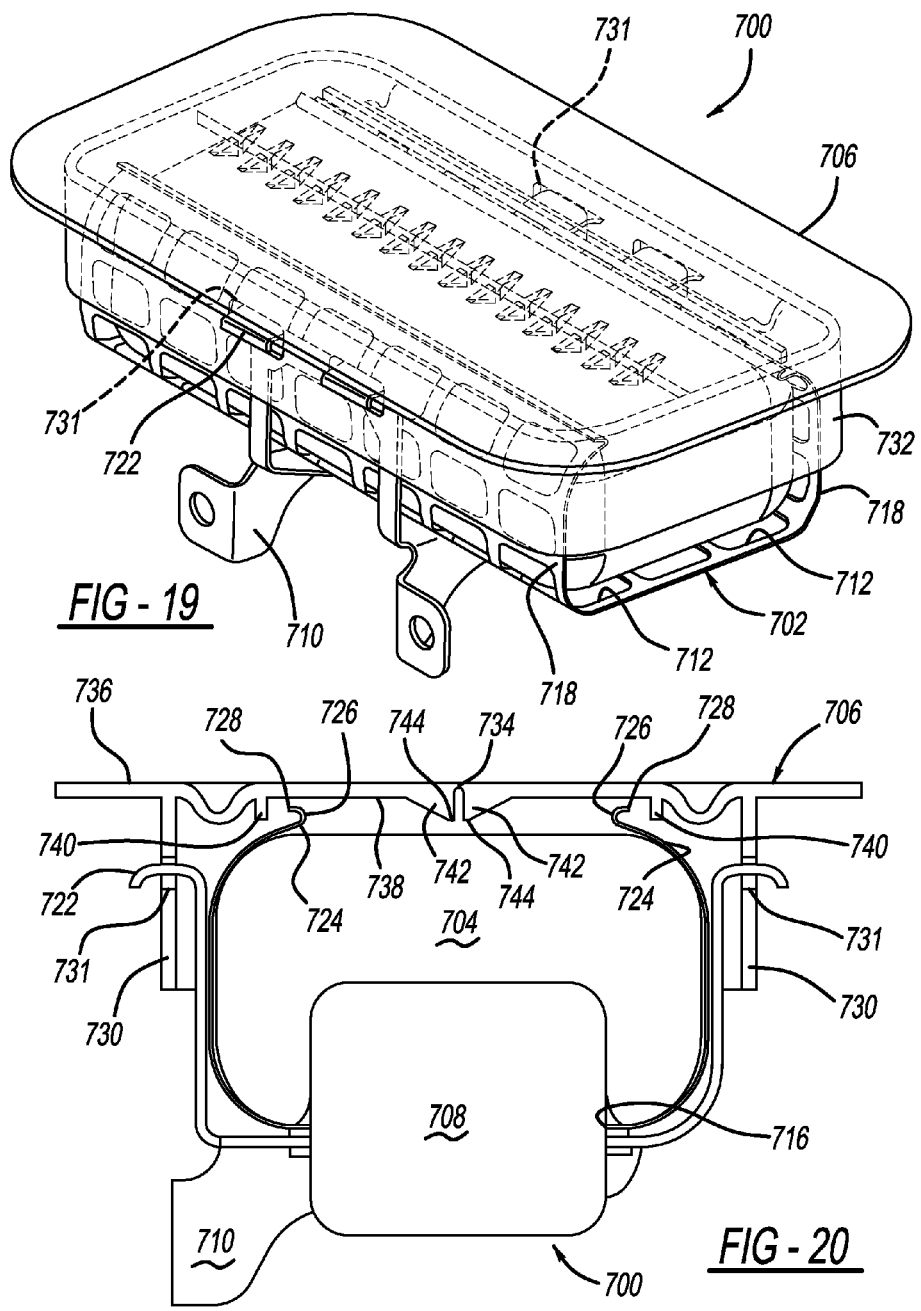

1

LOW MASS PASSENGER AIRBAG DESIGN

FIELD

The present disclosure relates to an airbag module of a motor vehicle and, specifically, to an airbag module for a passenger-side of a motor vehicle.

BACKGROUND

FIG. 26 illustrates a conventional passenger-side airbag module 10. Airbag module 10 includes a housing 12 that includes an airbag 14. Housing 12 is generally rectangular-shaped, and includes sidewalls 16 and 18. To inflate airbag 14, airbag module 10 also includes an inflator (not shown) that rapidly releases gas to inflate airbag 14.

To enclose housing 12 after airbag 14 has been folded therein, airbag module 10 includes a chute 22 that attaches to housing 12 via hook-shaped tabs 24 that engage with apertures 26 formed in chute 22. Chute 22 includes a seam 28 formed in an upper surface 30 thereof. During deployment of airbag 14, seam 28 will open and allow airbag 14 to escape housing 12 and chute 22. Upper surface 30 of chute 22 is engaged with an underside of the passenger-side instrument panel 31, with a foam material (not shown) therebetween. To assist in ensuring that airbag 14 properly deploys, the instrument panel may also include a seam (not shown) that is aligned with seam 28 of chute 22. Accordingly, when airbag 14 is inflated and seam 28 of chute 22 opens, the seam (not shown) of the instrument panel will also open to allow airbag 14 to fully inflate.

During release of the rapidly expanding gas from inflator 20, forces will be experienced by airbag module 10 in all directions. That is, the force of the rapidly expanding gas is not only directed toward seam 28 of chute 22 to open seam 28, but rather the force will be directed at sidewalls 16 and 18 of housing 12 as well. To ensure that housing 12 maintains structural integrity while experiencing these forces, housing 12 is formed of rigid materials such as heavy gauge steel. The use of such rigid materials for housing 12 can increase the mass of airbag module 10, as well as increase the mass of the vehicle. Further, because the force of the rapidly expanding gas is released in all directions, only a portion of the force of the rapidly expanding gas is used to open seam 28 of chute 22 and to open the seam (not shown) of the instrument panel (not shown). As only a portion of the force is used to open seam 28, seam 28 may not fully open, which is undesirable.

Moreover, to increase fuel economy of motor vehicles, there is a continual push to develop vehicles having lower mass. As such, considerable efforts are being made to use and develop devices and materials for motor vehicles that can assist in the reduction of mass of the vehicle. Accordingly, it is desirable to produce an airbag module that is lower in mass, but more effective in ensuring that the airbag properly deploys.

SUMMARY

The present disclosure provides an airbag module including a housing, an airbag disposed within the housing, and a chute enclosing the airbag within the housing. The chute includes a seam formed therein that is operable to open during deployment of the airbag, wherein the chute includes a projection that extends toward the housing, and the housing includes a grasping feature that engages with the projection during deployment of the airbag to assist in opening the seam.

The present disclosure also provides an airbag module including a housing, a focus plate coupled to the housing, an airbag disposed within the housing, and a chute including a seam that encloses the airbag within the housing. The chute includes a pair of projections that extend toward an interior of the housing toward the focus plate, wherein the focus plate includes a first pair of slots that correspond to and engage with the pair of projections formed on the chute such that during deployment of the airbag, the pair of projections and first pair of slots cooperate to open the seam.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 13 is a perspective view of the airbag module illustrated in FIG. 11, with an element of the airbag module removed;

FIG. 14 is a perspective view of another mating feature in accordance with an aspect of the present disclosure;

FIG. 15 is a perspective view of a focus plate in accordance with an aspect of the present disclosure;

FIG. 16 is a perspective view of another focus plate in accordance with an aspect of the present disclosure;

FIG. 17 is a perspective view of a chute device in accordance with an aspect of the present disclosure;

FIG. 18 is a cross-sectional view illustrating an airbag module configuration including the focus plate of FIG. 16 and the chute device of FIG. 17;

FIG. 19 is a perspective view of an airbag module according to a principle of the present disclosure;

FIG. 20 is a cross-sectional view of the airbag module illustrated in FIG. 19;

DETAILED DESCRIPTION

The present disclosure provides an airbag module that has reduced mass, as well as an improved seam release mechanism that assists in ensuring that the airbag will properly deploy during inflation thereof. Although the below description will primarily be directed to an airbag module designed for use as a passenger-side airbag module, the present disclosure should not be limited thereto. Rather, it should be understood that the teachings of the present disclosure are equally applicable to a driver-side airbag module or a side-curtain airbag module without departing from the scope of the present disclosure.

Figure 1:
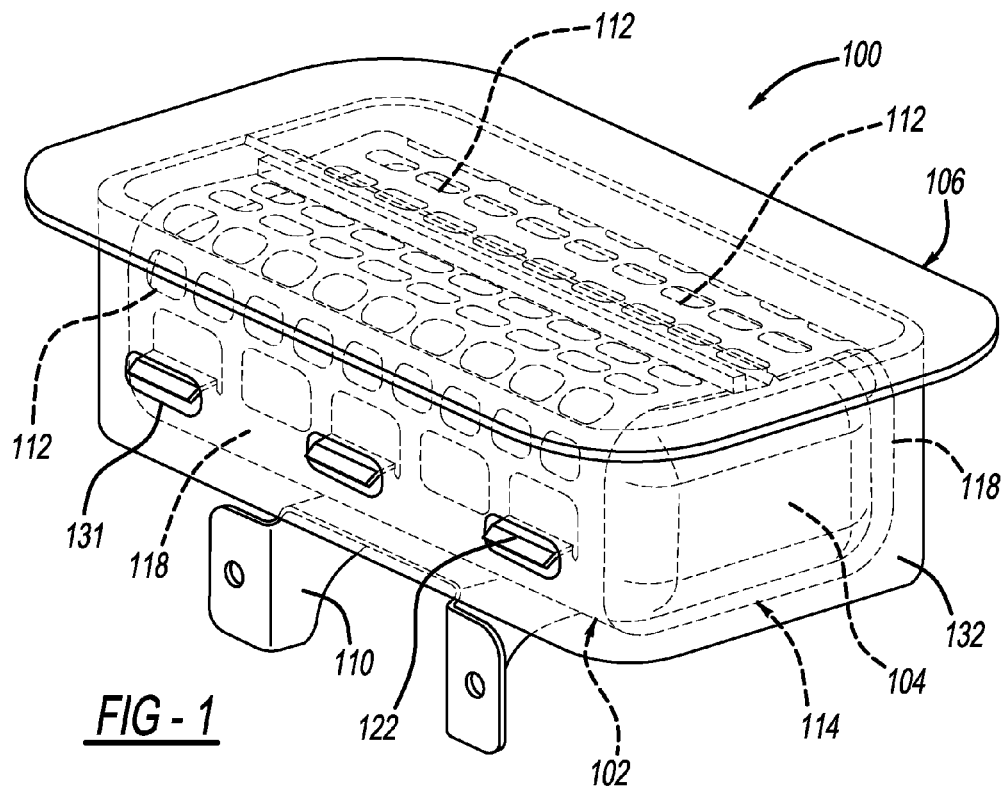
FIG. 1 is a perspective view of an airbag module according to a principle of the present disclosure.
Figure 2:
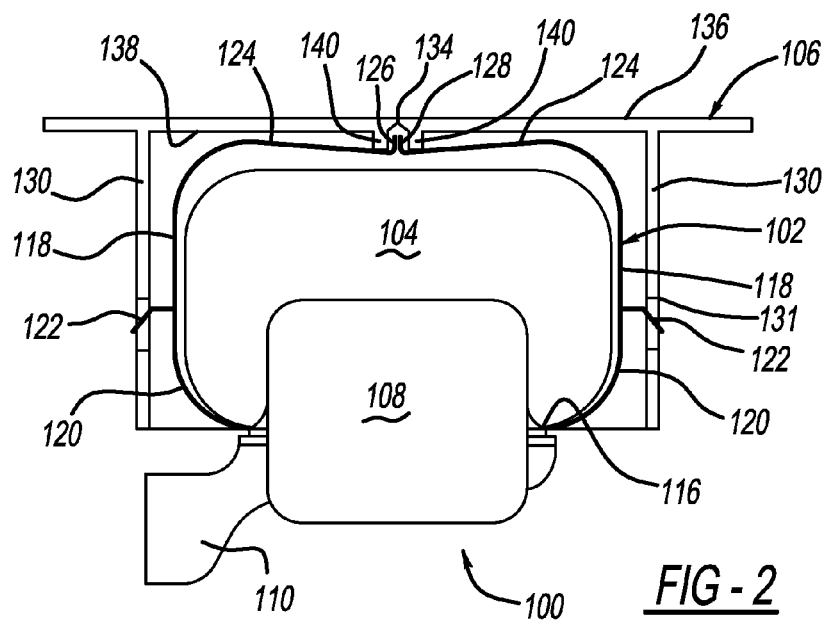
FIG. 2 is a cross-sectional view of the airbag module illustrated in FIG. 1.
Figure 3:
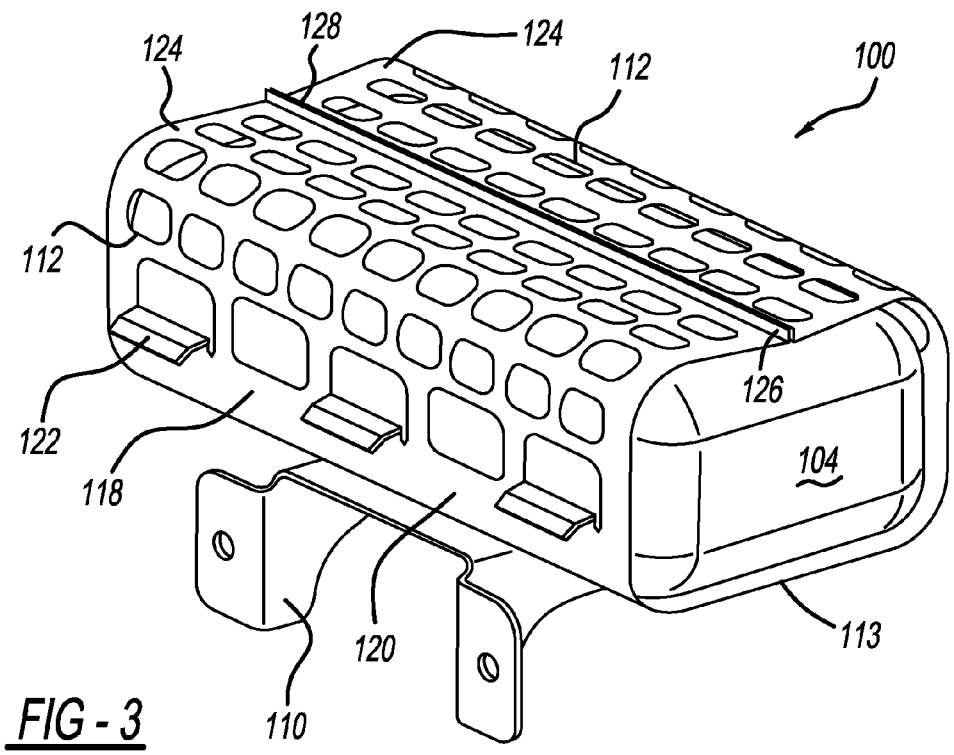
FIG. 3 is a perspective view of the airbag module illustrated in FIG. 1, with an element of the airbag module removed.

Referring to FIGS. 1-3, an exemplary airbag module 100 in accordance with the present disclosure is illustrated. Airbag module 100 may include a housing 102, an airbag 104, a chute 106, an inflator 108, and a mounting bracket 110 for mounting airbag module 100 to a structural member (not shown) of a motor vehicle (not shown).

Housing 102, although formed from a material such as steel, is flexible. Flexibility in housing 102 is provided by reducing a thickness of the material used to form housing 102, and by also forming a plurality of perforations 112 in housing 102. For example, housing 102 may be formed from steel having a thickness of 0.5 mm. Other materials having different thicknesses, however, are contemplated. Forming housing 102 from material having a reduced thickness and perforations 112 reduces mass of housing 102, which reduces mass of airbag module 100.

Housing 102 can include a base panel 114 that may be fixed to mounting bracket 110, and including a centrally disposed aperture 116 for accommodating inflator 108. Extending from base panel 114 may be a pair of side panels 118 that may be folded to wrap around airbag 104. At a portion 120 of each side panel 118 adjacent base panel 114 may be formed a plurality of hook-shaped tabs 122 that can be used to secure chute 106 to housing 102. At a second portion 124 of each side panel 118 may be formed a grasping feature in the form of a flange 126 that extends orthogonal to side panel 118. Flange 126 can be unitary with side panel 118, and defines a terminal edge 128 of side panels 118.

Chute 106 can be formed of a rigid, yet soft material such as a thermoplastic elastomer, and can include a first pair of side walls 130 and a second pair of side walls 132. In each side wall 130 can be formed apertures 131 that correspond to and engage with hook-shaped tabs 122 to secure chute 106 to housing 102. Side walls 132 enclose airbag 104 at locations where housing 102 is not provided, which provides structural support to airbag module 100 during inflation of airbag 104.

A seam 134 is formed in an upper surface 136 of chute 106. Seam 134 is designed to open during deployment of airbag 104, and corresponds to another seam (not shown) formed in a passenger-side instrument panel. An opposing surface 138 of upper surface 136 (i.e., a surface 138 that faces side panels 118 of housing 102) defines a pair of inwardly extending projections or lips 140. Lips 140 are formed to protrude from opposing surface 138 on opposing sides of seam 134. Lips 140 are designed to engage with flanges 126 of housing 102 during deployment of airbag 104, as will be described in more detail below.

During inflation of airbag 104, rapidly expanding gas is released by inflator 108. As gases released by inflator 8 begin to fill airbag 104, airbag 104 will expand in all directions. That is, airbag 104 will begin expanding in a direction toward opposing surface 138 of chute 106, toward side panels 118 of housing 102, and even toward mounting bracket 110. During this expansion of airbag 104, side panels 118 because of their flexibility will begin to be forced outward in a manner where a distance between terminal edges 128 will increase. As the distance between terminal edges 128 increases, flanges 126 will engage with lips 140. Because flanges 126 engage with lips 140, the force being exerted on side panels 118 by the expanding airbag 104 can be transferred through flange 126 to lips 140. Once the force is transferred to lips 140, the distance between lips 140 will begin to increase, which assists in opening seam 134 and the seam (not shown) of the instrument panel (not shown).

Because force from the expanding airbag 104 can be successfully transferred to chute 106 to open seam 134 via the housing 102, housing 102 does not need to be formed from a rigid and inflexible material like that of the conventional airbag module 10. Accordingly, the mass of airbag housing 102 can be reduced, which assists in reducing the overall mass of the motor vehicle. Further, although airbag module 100 is of a reduced mass in comparison to conventional airbag module 10, airbag 104 is more reliably deployed due to the force of the expanding airbag being focused at seam 134.

Figure 4:
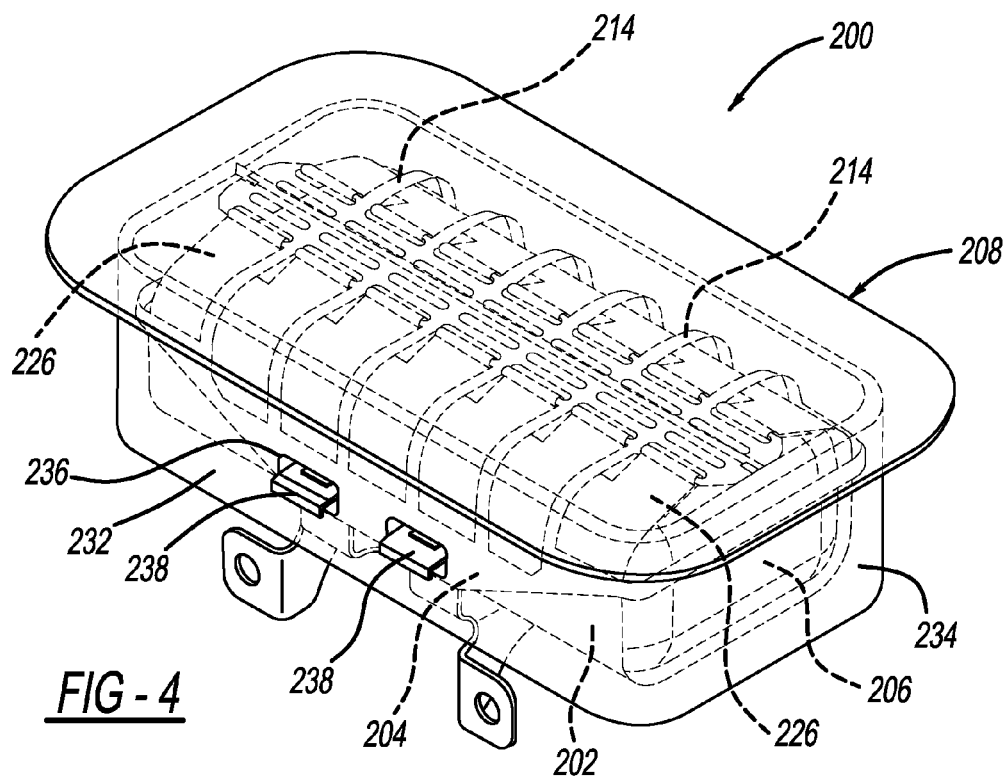
FIG. 4 is a perspective view of an airbag module according to a principle of the present disclosure.
Figure 5:
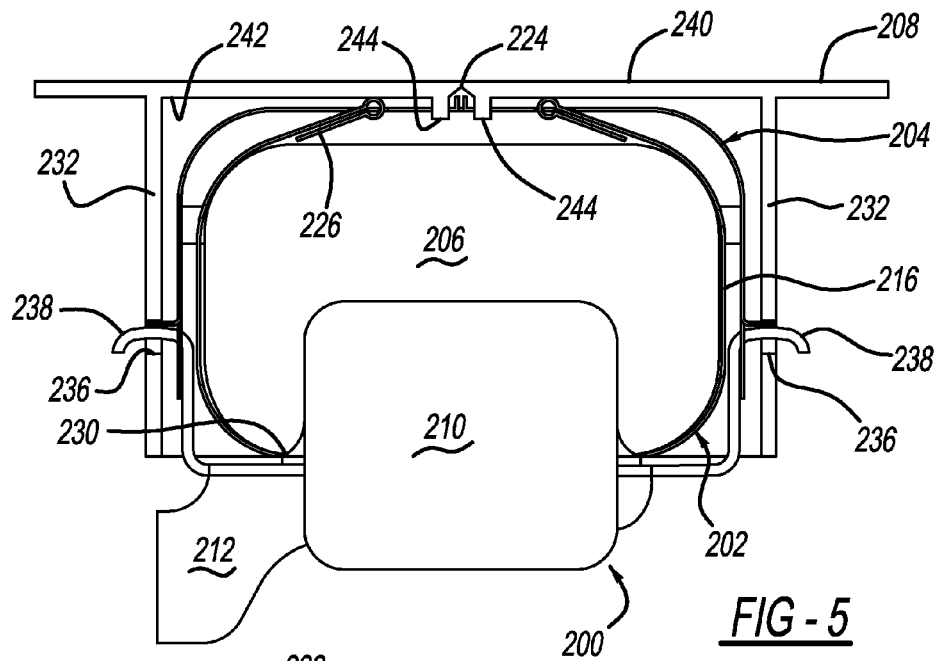
FIG. 5 is a cross-sectional view of the airbag module illustrated in FIG. 4.
Figure 6:
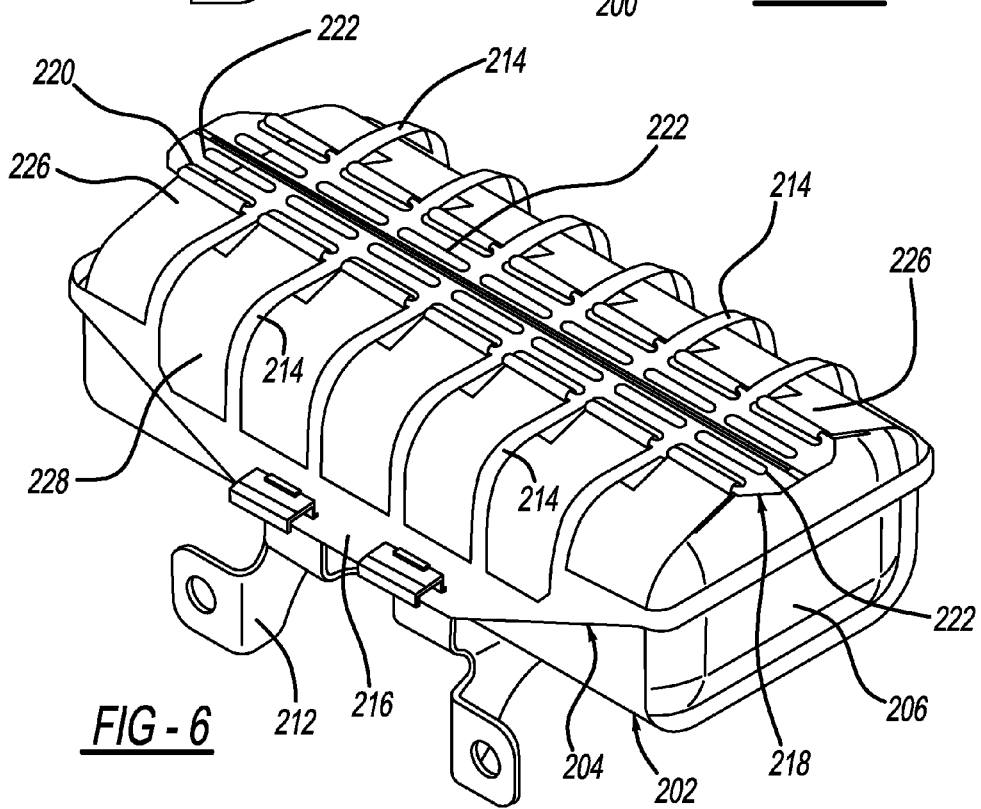
FIG. 6 is a perspective view of the airbag module illustrated in FIG. 4, with an element of the airbag module removed.
Figure 7:
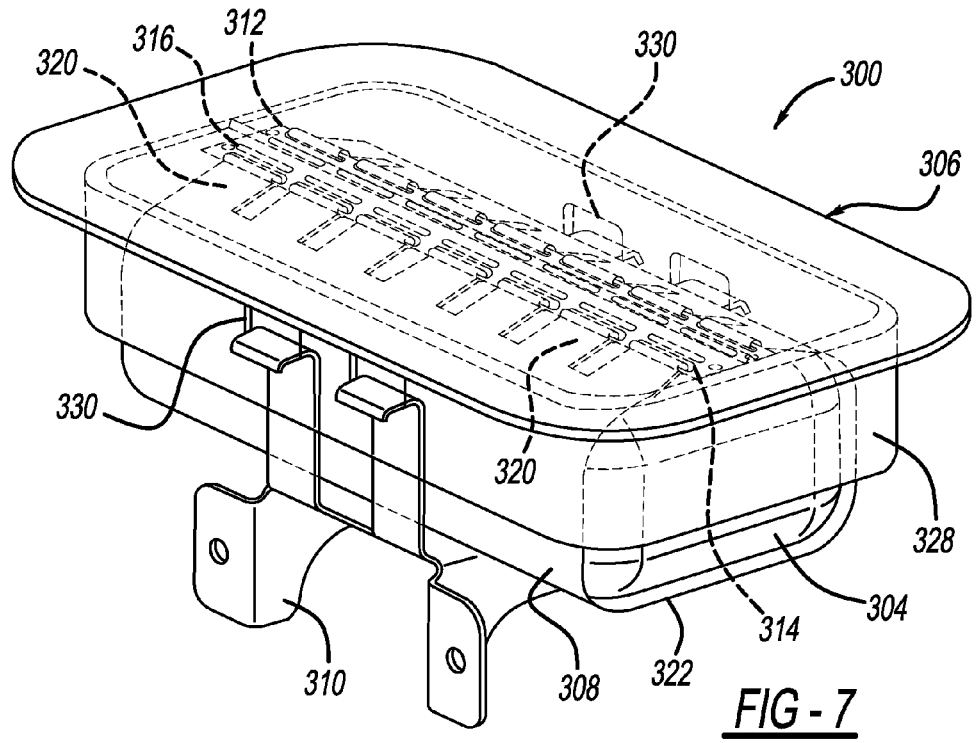
FIG. 7 is a perspective view of an airbag module according to a principle of the present disclosure.
Figure 8:
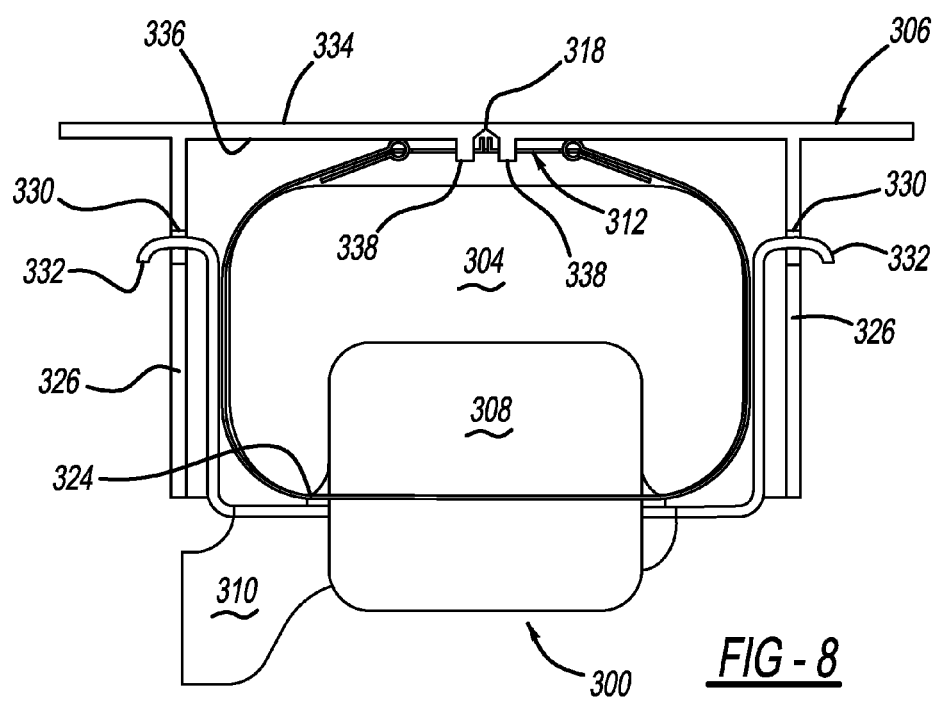
FIG. 8 is a cross-sectional view of the airbag module illustrated in FIG. 7.
Figure 9:
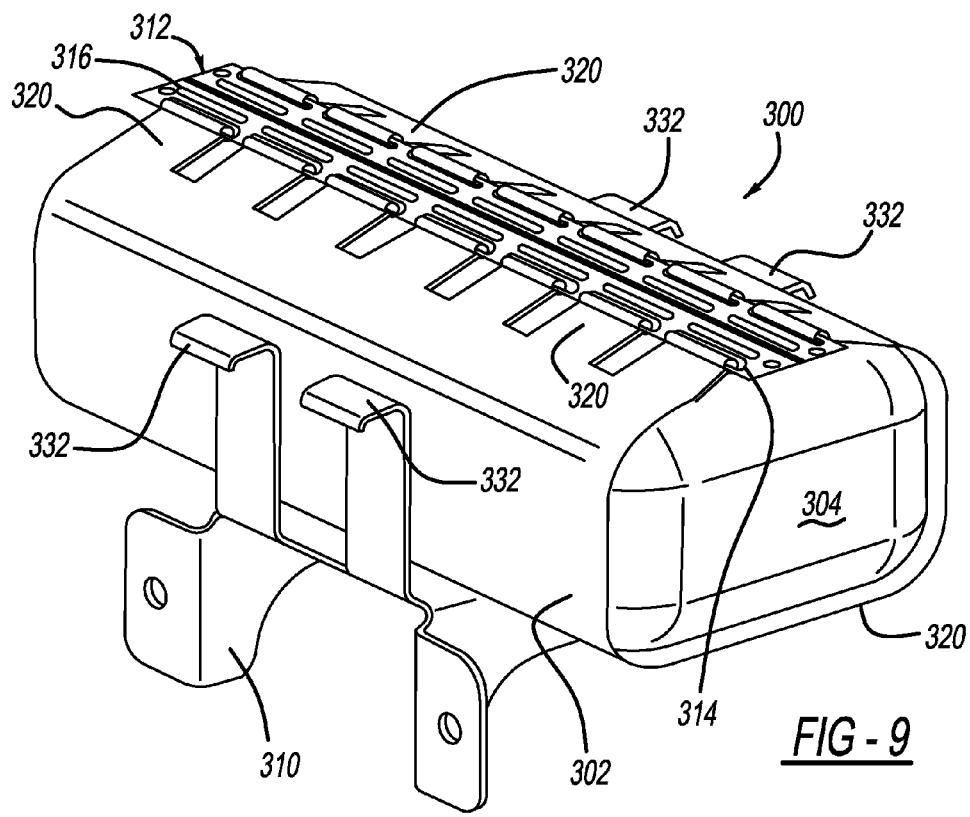
FIG. 9 is a perspective view of the airbag module illustrated in FIG. 7, with an element of the airbag module removed.

Now referring to FIGS. 4-6, another exemplary airbag module 200 in accordance with the present disclosure is illustrated. Airbag module 200 may include a primary housing 202, a secondary housing 204, an airbag 206, a chute 208, an inflator 210, and a mounting bracket 212 for mounting airbag module 200 to a structural member (not shown) of a motor vehicle (not shown).

Primary housing 202 in the illustrated embodiment may be formed from a heavy fiberglass fabric. Forming primary housing 202 from a material such as a fiberglass fabric reduces mass of primary housing 202, which reduces mass of airbag module 200. In contrast to primary housing 202, secondary housing 204 can be formed from a material such as steel having a thickness of 0.5 mm. Secondary housing 204 includes a plurality of straps 214 that extend from a mounting portion 216 that is secured to mounting bracket 212. Because straps 214 of secondary housing 204 are formed from a steel material having reduced thickness, flexibility in housing 204 is provided. Although not illustrated in the figures, mounting portion 216 can be secured to mounting bracket 212 by using fasteners or welding.

Straps 214 extend over primary housing 202 and connect to primary housing 202 at a focus plate 218 that is unitary with straps 214. In this regard, focus plate 218 includes a first plurality of slots 220 and a second plurality of slots 222 that extend transverse to a length of straps 214. Second plurality of slots 222 are located at a position more proximate seam 224 formed in chute 208, and act as a grasping feature. Regardless, primary housing 202 can include a plurality of connection portions 226 that are designed to loop through corresponding slots 220 to secure primary housing 202 with secondary housing 204. Primary housing 202 can also include a base panel 228 that may be fixed to mounting bracket 212, and includes a centrally disposed aperture 230 for accommodating inflator 210.

Chute 208 can be formed of a rigid, yet soft material such as a thermoplastic elastomer, and can include a first pair of side walls 232 and a second pair of side walls 234. In each side wall 232 can be formed apertures 236 that correspond to and engage with hook-shaped tabs 238 formed on mounting bracket 212 to secure chute 208 to mounting bracket 212. Side walls 234 enclose airbag 104 at locations where primary and secondary housings 202 and 204 are not provided, which provides structural support to airbag module 200 during inflation of airbag 206.

As noted above, seam 224 is formed in an upper surface 240 of chute 208. Seam 224 is designed to open during deployment of airbag 206, and corresponds to another seam (not shown) formed in a passenger-side instrument panel. An opposing surface 242 of upper surface 240 (i.e., a surface 242 that faces straps 214 of secondary housing 204) defines a plurality of inwardly extending projections or lips 244. Lips 244 are formed to protrude from opposing surface 242 on opposing sides of seam 224, and are designed to engage with the grasping feature (slots 222) of focus plate 218 during deployment of airbag 206, as will be described in more detail below.

During inflation of airbag 206, a rapidly expanding gas may be released by inflator 210. As gases released by inflator 210 begin to fill airbag 206, airbag 206 will expand in all directions. During this expansion of airbag 206, slots 222 will engage with lips 244. Because slots 222 engage with lips 244, the force being exerted by the expanding airbag 206 can be transferred through slots 222 to lips 244. Once the force is transferred to lips 244, the distance between lips 244 will begin to increase, which assists in opening seam 224 and the seam (not shown) of the instrument panel (not shown).

Because force from the expanding airbag 206 can be successfully transferred to chute 208 to open seam 224 via the focus plate 218, primary and secondary housings 202 and 204 do not need to be formed from a rigid and inflexible material like that of the conventional airbag module 10. Accordingly, the mass of airbag module 200 can be reduced, which assists in reducing the overall mass of the motor vehicle. Further, although airbag module 200 is of a reduced mass in comparison to conventional airbag module 10, airbag 206 is more reliably deployed due to the force of the expanding airbag 206 being focused at seam 224.

Now referring to FIGS. 7-10, another exemplary airbag module 300 in accordance with the present disclosure is illustrated. Airbag module 300 is similar to airbag module 200, but does not utilize each feature of secondary housing 204. More particularly, airbag module 300 includes a housing 302, an airbag 304, a chute 306, an inflator 308, and a mounting bracket 310 for mounting airbag module 100 to a structural member (not shown) of a motor vehicle (not shown).

Housing 302, similar to primary housing 202, may be formed from a heavy fiberglass fabric. Forming housing 302 from a material such as a fiberglass fabric reduces mass of housing 302, which reduces mass of airbag module 300. In contrast to airbag module 200, however, airbag module 300 only includes the feature of a focus plate 312 that includes a first plurality of slots 314 and a second plurality of slots 316 that act as a grasping feature. That is, the straps 214 of secondary housing 204 are eliminated.

Focus plate 312 extends parallel to a seam 318 formed in chute 306. Second plurality of slots 316 are located at a position more proximate seam 318, while first plurality of slots 314 are located at a position more distal from seam 318. First plurality of slots 314 are operable to engage with a plurality of connection portions 320 of housing 302. In this regard, connection portions 320 are designed to loop through slots 314 to secure housing 302 with focus plate 312. Housing 302 can also include a base panel 322 that may be fixed to mounting bracket 310, and includes a centrally disposed aperture 324 for accommodating inflator 308.

Chute 306 can be formed of a rigid, yet soft material such as a thermoplastic elastomer, and can include a first pair of side walls 326 and a second pair of side walls 328. In each side wall 326 can be formed apertures 330 that correspond to and engage with hook-shaped tabs 332 formed on mounting bracket 310 to secure chute 306 to mounting bracket 310. Side walls 328 enclose airbag 304 at locations where housing 302 is not provided, which provides structural support to airbag module 300 during inflation of airbag 304.

As noted above, seam 318 is formed in an upper surface 334 of chute 306. Seam 318 is designed to open during deployment of airbag 304, and corresponds to another seam (not shown) formed in a passenger-side instrument panel. An opposing surface 336 of upper surface 334 (i.e., a surface 336 that faces focus plate 312) defines a plurality of inwardly extending projections or lips 338. Lips 338 are formed to protrude from opposing surface 336 on opposing sides of seam 318, and are designed to engage with slots 316 of focus plate 312 during deployment of airbag 304, as will be described in more detail below.

During inflation of airbag 304, a rapidly expanding gas may be released by inflator 308. As gases released by inflator 308 begin to fill airbag 304, airbag 304 will expand in all directions. During this expansion of airbag 304, slots 316 will engage with lips 338. Because slots 316 engage with lips 338, the force being exerted by the expanding airbag 304 can be transferred through slots 316 to lips 338. Once the force is transferred to lips 338, the distance between lips 338 will begin to increase, which assists in opening seam 318 and the seam (not shown) of the instrument panel (not shown).

Because force from the expanding airbag 304 can be successfully transferred to chute 306 to open seam 318 via the focus plate 312, housing 302 does not need to be formed from a rigid and inflexible material like that of the conventional airbag module 10. Accordingly, the mass of airbag module 300 can be reduced, which assists in reducing the overall mass of the motor vehicle. Further, although airbag module 300 is of a reduced mass in comparison to conventional airbag module 10, airbag 304 is more reliably deployed due to the force of the expanding airbag 206 being focused at seam 224.

Figure 10:
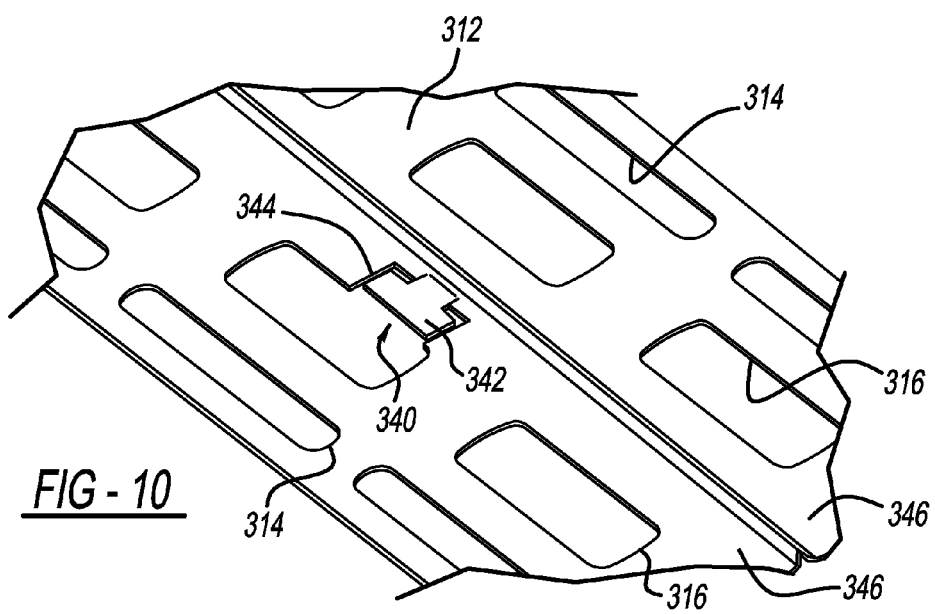
FIG. 10 is a perspective view of a mating feature in accordance with an aspect of the present disclosure.
Figure 11:
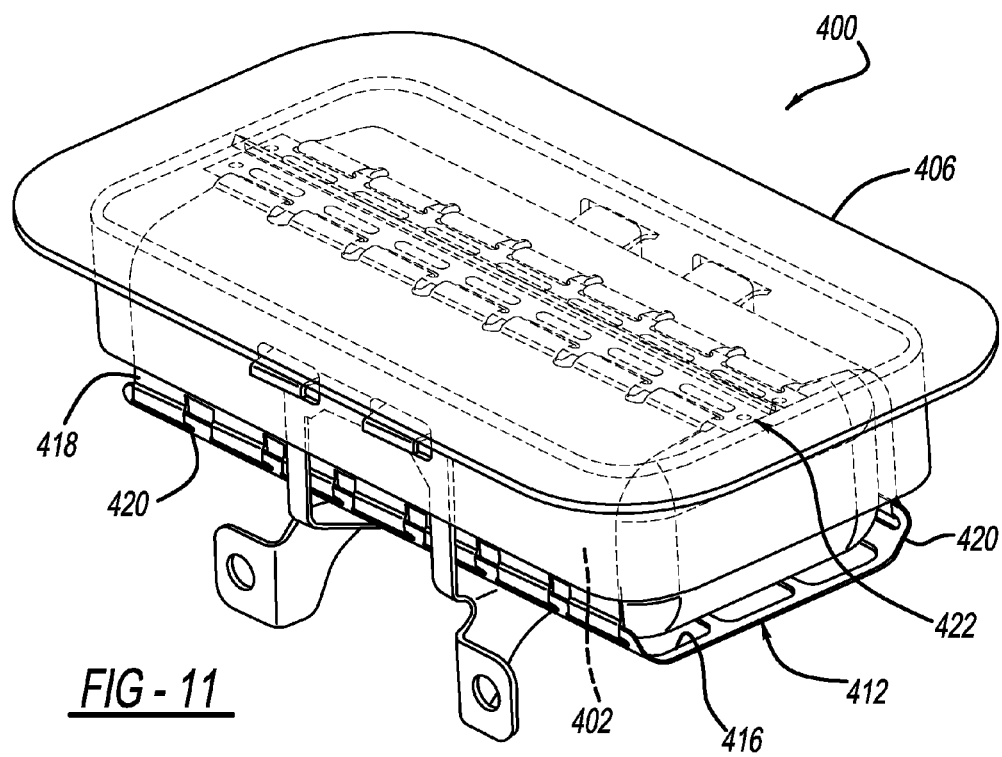
FIG. 11 is a perspective view of an airbag module according to a principle of the present disclosure.
Figure 12:
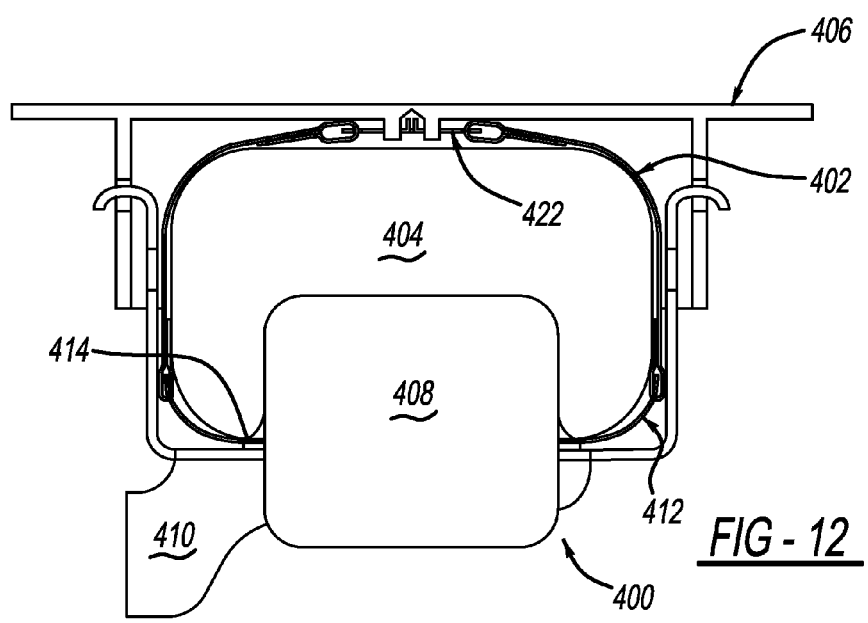
FIG. 12 is a cross-sectional view of the airbag module illustrated in FIG. 11.
Figure 21:
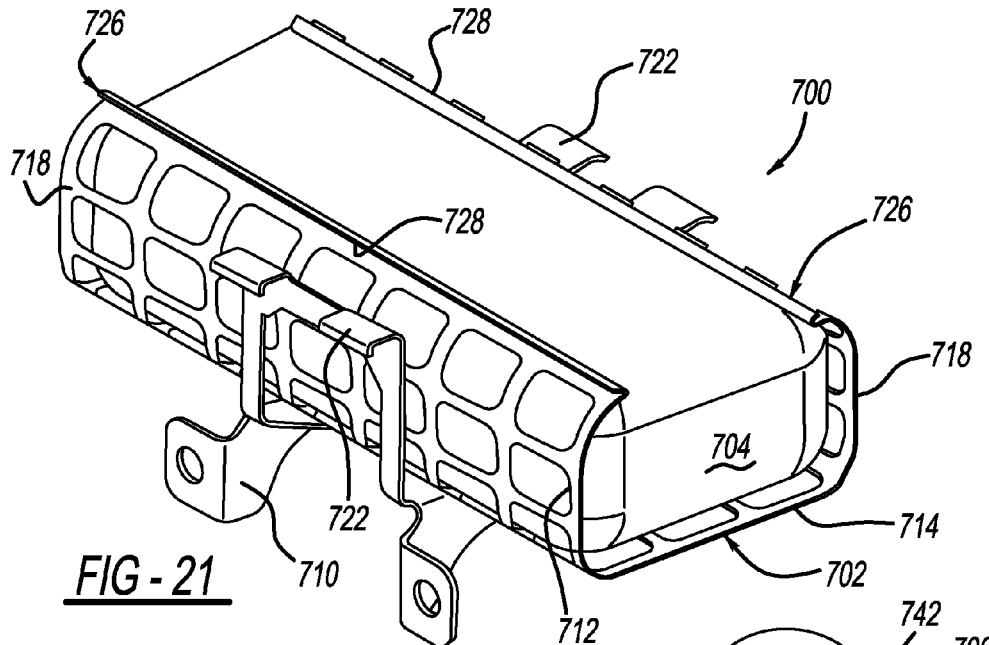
FIG. 21 is a perspective view of the airbag module illustrated in FIG. 19, with an element of the airbag module removed.
Figure 22:
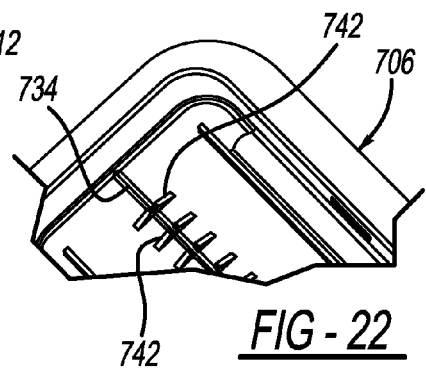
FIG. 22 is a perspective view of another chute device in accordance with an aspect of the present disclosure.

An additional feature of airbag module 300 is a mating feature 340 formed in focus plate 312. As best illustrated in FIG. 10, mating feature 340 may include a male connection 342 that mates with a female connection 344 to secure opposing portions 346 of focus plate 312. By securing opposing portions 346 of focus plate 312 through use of mating feature 340, housing 302 can be secured in a manner that envelopes about airbag 304, which increases the ease with which airbag module 300 is assembled and installed in a vehicle. That is, when opposing portions 346 are secured through mating feature 340, it becomes easier to align slots 316 with lips 338 of chute 306.

Additionally, airbag 304 is folded into housing 302 during assembly of airbag module 300, and will naturally attempt to bulge from housing 302 (like an expanding accordion) unless airbag 304 is properly restrained from doing so. By securing opposing portions 346 of focus plate 312 with mating feature 342, airbag 304 is prevented from bulging from housing 302 before chute 306 is secured to housing 302.

Now referring to FIGS. 11-14, another exemplary airbag module 400 in accordance with the present disclosure is illustrated. Airbag module 400 is similar to airbag module 300, discussed above, and includes a housing 402, an airbag 404, a chute 406, an inflator 408, and a mounting bracket 410 for mounting airbag module 400 to a structural member (not shown) of a motor vehicle (not shown). The primary difference between airbag module 400 and airbag module 300 is that a secondary housing 412 is provided that may be formed of a material such as steel having a thickness of 0.5 mm. Secondary housing 412 includes a centrally disposed aperture 414 for accommodating inflator 408, and secondary housing 412 can be fixed to mounting bracket 410. Similar to housing 102, secondary housing 412 can include a plurality of perforations 416 that assist in reducing the mass of secondary housing 412.

Housing 402, similar to housing 302, may be formed from a heavy fiberglass fabric, which reduces the mass of airbag module 400. To secure housing 402 to secondary housing 412, housing 402 includes a plurality of connection portions 418 that engage with a plurality of connection slots 420 formed in secondary housing 412. The remaining features of airbag module 400, including the use of a focus plate 422 function the same as, for example, the focus plate 312 described above. The difference between focus plate 422 and focus plate 312, however, lies in the use of a different mating feature 424.

More specifically, referring to FIG. 14, it can be seen that mating feature 424 includes a pair of latches 426 disposed on opposing portions 428 of focus plate 422. Latches 426 may be formed of the same material as focus plate 422 (e.g., steel having a thickness of 0.5 mm) and, therefore, latches 426 may be flexible. Latches 426 are elongated sections of material formed on each opposing portion 428 that may be looped through a corresponding latch slot 430 to secure the opposing portions 428 to each other. Similar to mating feature 340, mating feature 424 simplifies the manufacturing process of airbag module 400. Further, although latches 426 are looped through latch slots 430, such a configuration does not preclude opposing portions 428 from separating during deployment of airbag 404. That is, the flexible material used to form focus plate 422 and latches 422 is rigid enough to maintain proper packaging of airbag module 400 during assembly thereof, but the material is not so rigid as to preclude opposing portions 428 from separating during airbag 404 deployment.

Now referring to FIG. 15, another exemplary focus plate 500 is illustrated. Focus plate 500 includes a first plurality of slots 502 for connecting focus plate 500 to, for example, housing 402 of airbag module 400. Focus plate 500 also includes a mating feature 504 including a pair of latches 506 disposed on opposing portions 508 of focus plate 500 that correspond to latch slots 509. Latches 506 and latch slots 509 function in the same manner as latches 426 and latch slots 430 to secure opposing portions 508 together during assembly of the airbag module equipped with focus plate 500.

Focus plate 500 also includes a pair of flanges 510 that define a plurality of first barbs 512. During deployment of an airbag (e.g., airbag 304), first barbs 512 will engage with a surface of a chute (e.g., chute 306) to assist in opening a seam (e.g., seam 318) formed therein. In addition, a pair of lips (e.g., lips 338) formed on the chute (e.g., chute 306) may be disposed between a plurality of third and fourth barbs 514 and 516, respectively. Similar to first barbs 512, third and fourth barbs 514 and 516 will engage with a surface of the chute (e.g., chute 306) and assist in opening the seam (e.g., seam 318) formed therein. That is, barbs 512, 514, and 516 are operable as a grasping feature. In this manner, deployment of the airbag (e.g., airbag 304) can be enhanced.

Now referring to FIGS. 16-18, a focus plate 600 specifically designed for a chute 602 will be described. As best shown in FIG. 16, focus plate 600 includes a first plurality of slots 604 located along a first peripheral edge 606 of each opposing portion 608. Slots 604 are for securing focus plate 600 to, for example, a housing (e.g., housing 402) of an airbag module (e.g., airbag module 400). A second peripheral edge 610 opposite to first peripheral edge 606 of each opposing portion 608 defines a downwardly extending flange 612. Downwardly extending flanges 612, as illustrated in FIG. 18, will abut each other during packaging of the airbag module that includes focus plate 600.

Focus plate 600 also includes a grasping feature in the form of a second plurality of slots 614 that are arranged transverse to the first plurality of slots 604. The second plurality of slots 614 are designed to correspond to and engage with a plurality of triangular shaped projections or ribs 616 formed on an inner surface 618 of chute 602 adjacent a seam 620. Each rib 616 includes an apex 622 that assists in opening seam 620 of chute 602 during deployment of an airbag 624. Furthermore, the abutment between flanges 612 of focus plate 600 also assists in opening seam 620 of chute 602.

More specifically, during deployment of airbag 624, the pressure exerted by the expanding airbag 624 in every direction will cause inner surface 618 of chute 602 to bulge in an upward direction. As the inner surface 618 begins to bulge, apexes 622 of ribs 616 will contact each other. Once apexes 622 of ribs 616 contact each other, the inner surface 618 will continue to bulge, which will case apexes 622 to act as levers that force seam 620 to separate and allow the airbag 624 to be released from chute 602. Similarly, contact between the flanges 612 may also allow flanges 612 to act as levers that further assist in separating seam 620. That is, as airbag 624 deploys, flanges 612 will begin to rotate relative to one another in a manner that forces flanges 612 away from each other. As flanges 612 are forced away from each other, the lever action caused through contact between the flanges 612 will assist in opening seam 620. In this manner, airbag 624 is more easily deployed from chute 602.

Now referring to FIGS. 19-22, another exemplary airbag module 100 will be described. Airbag module 100 may include a housing 702, an airbag 704, a chute 706, an inflator 708, and a mounting bracket 710 for mounting airbag module 700 to a structural member (not shown) of a motor vehicle (not shown).

Housing 702, although formed from a material such as steel, is flexible. Flexibility in housing 702 is provided by reducing a thickness of the material used to form housing 702, and by also forming a plurality of perforations 712 in housing 702. For example, housing 702 may be formed from steel having a thickness of 0.5 mm. Other materials having different thicknesses, however, are contemplated. Forming housing 702 from material having a reduced thickness and perforations 712 reduces mass of housing 702, which reduces mass of airbag module 700.

Housing 702 can include a base panel 714 that may be fixed to mounting bracket 710, and including a centrally disposed aperture 716 for accommodating inflator 708. Extending from base panel 714 may be a pair of side panels 718 that may be folded to wrap around airbag 704. At a portion 724 of each side panel 718 may be formed a grasping feature in the form of a hook flange 726 that extends orthogonal to side panel 718. Hook flange 726 can be unitary with side panel 718, and defines a terminal edge 728 of side panels 718.

Chute 706 can be formed of a rigid, yet soft material such as a thermoplastic elastomer, and can include a first pair of side walls 730 and a second pair of side walls 732. In each side wall 730 can be formed apertures 731 that correspond to and engage with hook-shaped tabs 722 formed on mounting bracket 710 to secure chute 106 to mounting bracket 710. Side walls 732 enclose airbag 704 at locations where housing 702 is not provided, which provides structural support to airbag module 700 during inflation of airbag 704.

A seam 734 is formed in an upper surface 736 of chute 706. Seam 734 is designed to open during deployment of airbag 704, and corresponds to another seam (not shown) formed in a passenger-side instrument panel. An opposing surface 738 of upper surface 736 (i.e., a surface 738 that faces hook flanges 726 of housing 702) defines a pair of inwardly extending projections or lips 740. Lips 740 are formed to protrude from opposing surface 738 on opposing sides of seam 734. Lips 740 are designed to engage with hook flanges 726 of housing 702 during deployment of airbag 704, which assists in opening seam 734.

Similar to chute 602, chute 706 also includes a plurality of triangular shaped ribs 742 formed on opposing surface 738 of chute 706 directly adjacent seam 734. Each rib 742 includes an apex 744 that assists in opening seam 734 of chute 706 during deployment of an airbag 704. More specifically, during deployment of airbag 704, the pressure exerted by the expanding airbag 704 in every direction will cause opposing surface 738 of chute 706 to bulge in an upward direction. As the opposing surface 738 begins to bulge, apexes 744 of ribs 742 will contact each other. Once apexes 744 of ribs 742 contact each other, the opposing surface 738 will continue to bulge, which will cause apexes 744 to act as levers that force seam 734 to separate and allow the airbag 704 to be released from chute 706.

Because force from the expanding airbag 704 can be successfully transferred to chute 706 to open seam 734 via the housing 702, housing 702 does not need to be formed from a rigid and inflexible material like that of the conventional airbag module 10. Accordingly, the mass of airbag housing 702 can be reduced, which assists in reducing the overall mass of the motor vehicle. Further, although airbag module 700 is of a reduced mass in comparison to conventional airbag module 10, airbag 704 is more reliably deployed due to the force of the expanding airbag being focused at seam 734.

Figure 23:
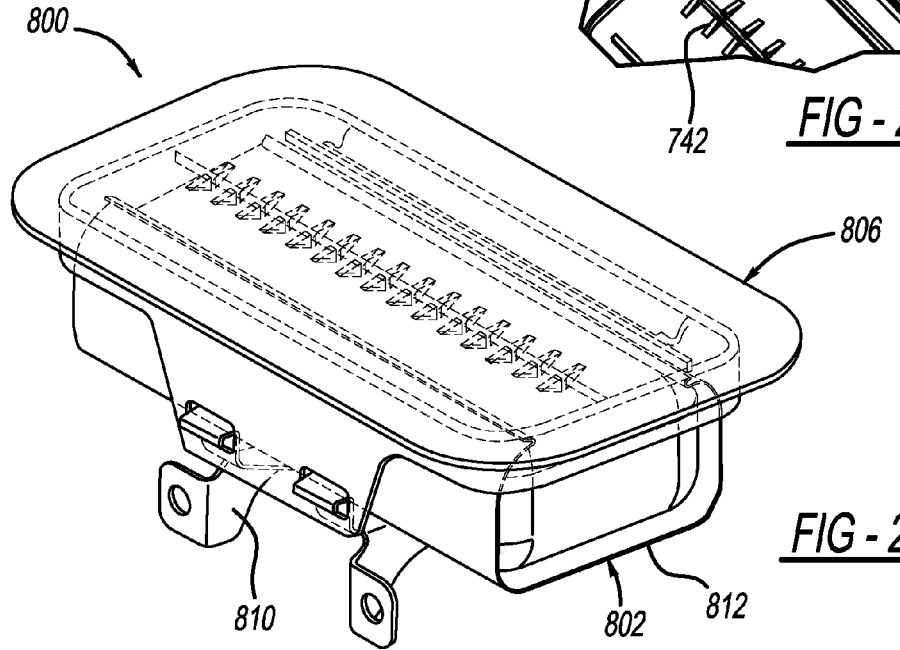
FIG. 23 is a perspective view of an airbag module according to a principle of the present disclosure.
Figure 24:
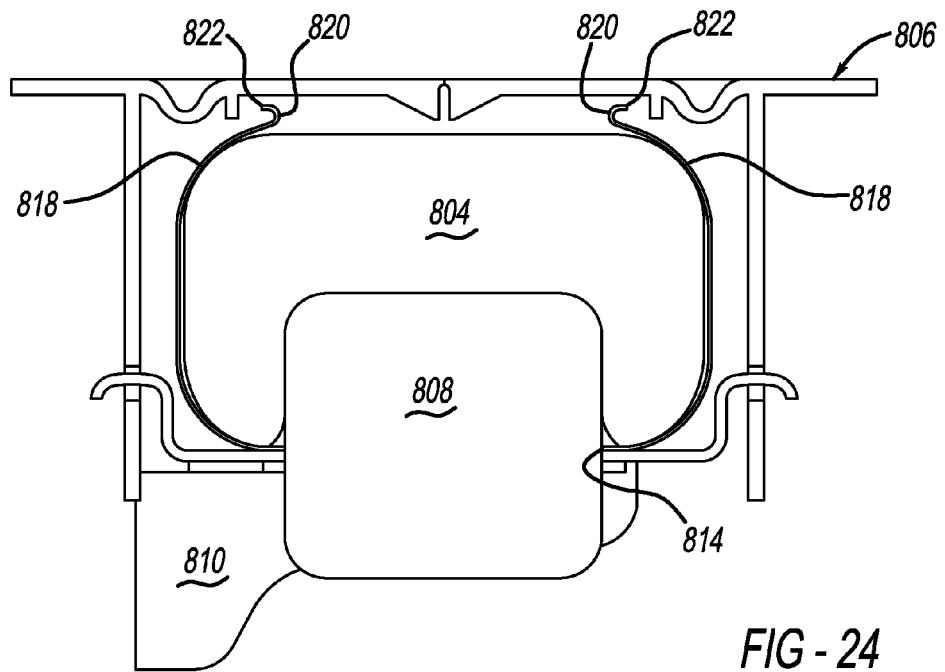
FIG. 24 is a cross-sectional view of the airbag module illustrated in FIG. 23.
Figure 25:
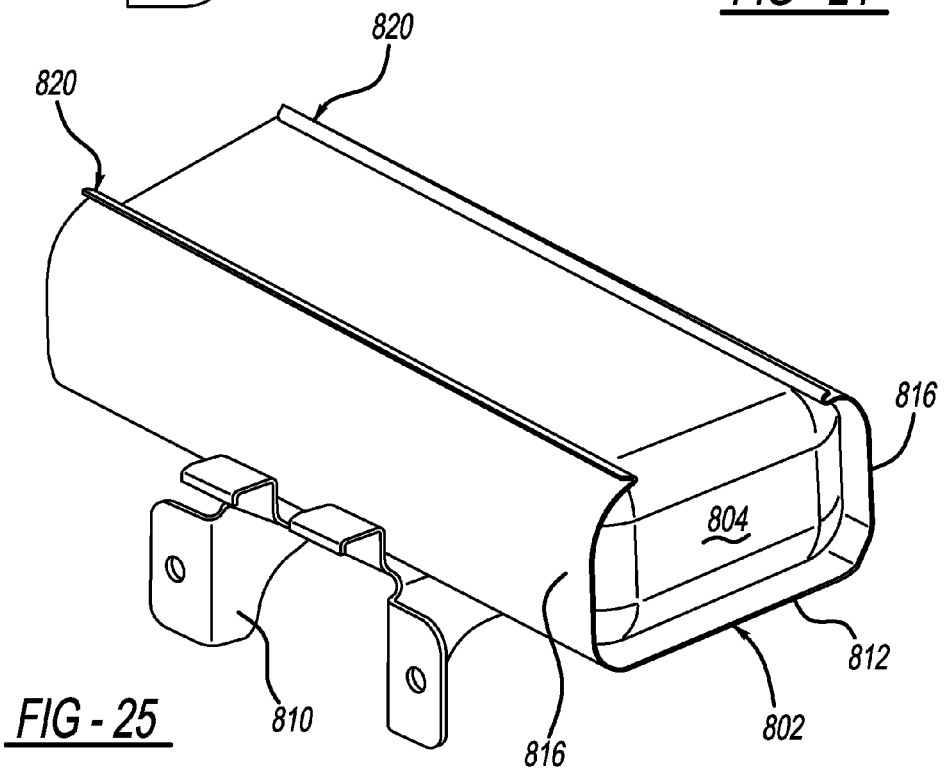
FIG. 25 is a perspective view of the airbag module illustrated in FIG. 23, with an element of the airbag module removed.
Figure 26:
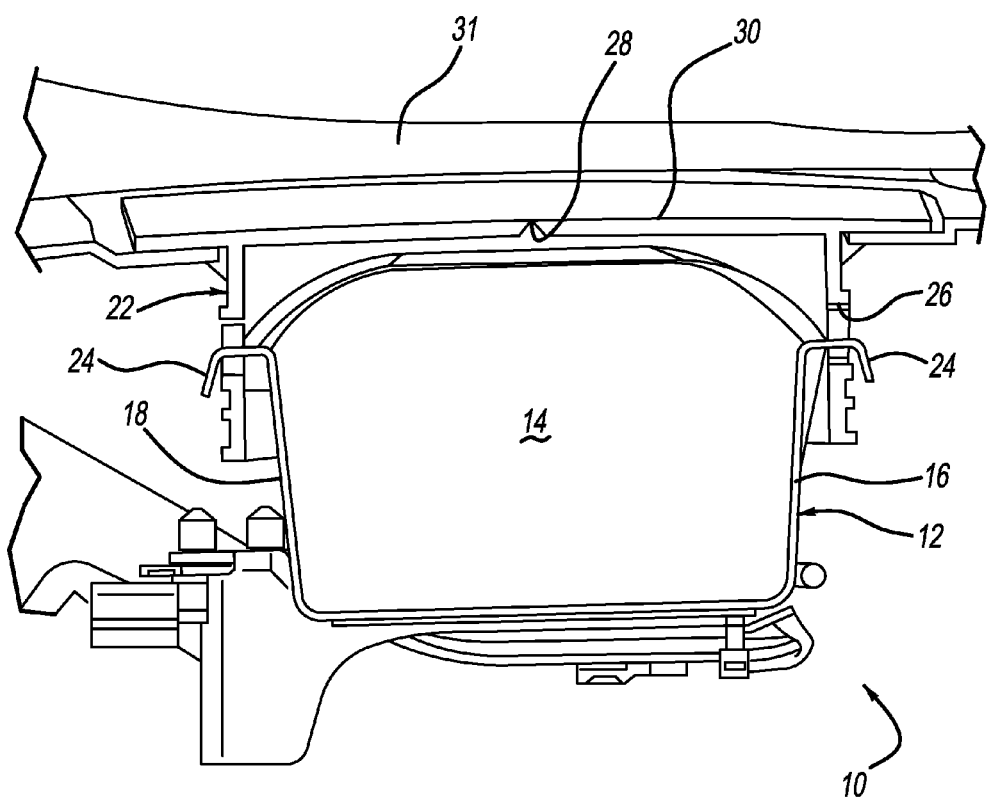
FIG. 26 illustrates a conventional airbag module.

Lastly, referring to FIGS. 23-25, another exemplary airbag module 800 is illustrated. Airbag module 800 includes a housing 802, an airbag 804, a chute 806, an inflator 808, and a mounting bracket 810. Housing 802 can include a base panel 812 that may be fixed to mounting bracket 810, and including a centrally disposed aperture 814 for accommodating inflator 808. Extending from base panel 812 may be a pair of side panels 816 that may be folded to wrap around airbag 804. At a portion 818 of each side panel 816 may be formed a hook flange 820 that extends orthogonal to side panel 816. Hook flange 820 can be unitary with side panel 816, and defines a terminal edge 822 of side panels 816. Because chute 806 is the same as chute 706, described above, a description regarding the features of chute 806 and how the features collaborate with hook flanges 820 will be omitted.

Housing 802, although formed from a material such as steel, is flexible. Flexibility in housing 802 is provided by reducing a thickness of the material used to form housing 802. For example, housing 802 may be formed from steel having a thickness of 0.25 mm. Other materials having different thicknesses, however, are contemplated. Forming housing 802 from material having a reduced thickness reduces mass of housing 802, which reduces mass of airbag module 800.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airbag module, comprising:
a housing;
an airbag disposed within the housing; and
a chute enclosing the airbag within the housing, the chute including a seam formed therein that is operable to open during deployment of the airbag,
wherein the housing includes a primary housing and a secondary housing that extends over the primary housing, the second housing including a focus plate aligned with the seam that includes a first slot and a second slot, the primary housing being coupled to the first slot, and
wherein the chute includes a projection that extends toward the focus plate and engages with the second slot during deployment of the airbag to assist in opening the seam.

2. The airbag module of claim 1, wherein the projection is an inwardly extending lip, the secondary housing includes a grasping feature formed as a flange, and the flange engages the inwardly extending lip during deployment of the airbag.

3. The airbag module of claim 1, wherein the projection is an inwardly extending lip, and the inwardly extending lip and the second slot cooperate to open the seam during deployment of the airbag.

4. The airbag module of claim 1, wherein the focus plate includes a mating feature.

5. The airbag module of claim 4, wherein the mating feature includes a male connection that cooperates with a female connection.

6. The airbag module of claim 4, wherein the mating feature includes a latching portion that engages with a slot portion.

7. The airbag module of claim 1, wherein the second housing includes a plurality of perforations.

8. The airbag module of claim 1, wherein the primary housing is formed of a fiberglass fabric.

9. The airbag module of claim 1, wherein the projection is a triangular-shaped rib that is operable as a lever during deployment of the airbag.

10. The airbag module of claim 1, wherein the focus plate includes a grasping feature, the grasping feature including a plurality of barbs that engage with the chute during deployment of the airbag.

11. The airbag module of claim 1, wherein the housing is formed of a steel material having a thickness in the range of 0.25 mm to 0.5 mm.

12. An airbag module, comprising:
a housing having a pair of connection portions;
a focus plate including a first pair of slots that correspond to and engage with the pair of connection portions;
an airbag disposed within the housing; and
a chute including a seam that encloses the airbag within the housing, the chute includes a pair of projections that extend toward an interior of the housing toward the focus plate,
wherein the focus plate includes a pair of second slots that correspond to and engage with the pair of projections formed on the chute such that during deployment of the airbag, the pair of projections and pair of second slots cooperate to open the seam.

13. The airbag module of claim 12, wherein the focus plate includes a mating feature.

14. The airbag module of claim 12, wherein the focus plate is unitary with a secondary housing that extends over the housing.

15. The airbag module of claim 12, wherein the projections are triangular-shaped ribs that, during deployment of the airbag, engage each other to act as a pair of levers that open the seam.

16. The airbag module of claim 12, wherein the focus plate includes a plurality of barbs that engage the chute during deployment of the airbag.

17. The airbag module of claim 12, wherein the housing is formed from at least one of a perforated steel material and a fiberglass fabric material.

\* \* \* \* \*